US012660854B2

(12) United States Patent
Matsuda et al.

(10) Patent No.: US 12,660,854 B2
(45) Date of Patent: Jun. 23, 2026

(54) CARTRIDGE AND NON-COMBUSTION TYPE SUCTION DEVICE

(71) Applicant: Japan Tobacco Inc., Tokyo (JP)

(72) Inventors: Kentaro Matsuda, Tokyo (JP); Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 567 days.

(21) Appl. No.: 17/741,168

(22) Filed: May 10, 2022

(65) Prior Publication Data

US 2022/0264951 A1 Aug. 25, 2022

Related U.S. Application Data

(63) Continuation of application No. PCT/JP2020/008234, filed on Feb. 28, 2020.

(51) Int. Cl.

| | |
|---|---|
| ***A24F 40/42*** | (2020.01) |
| ***A24F 40/10*** | (2020.01) |
| ***A24F 40/44*** | (2020.01) |
| ***A24F 40/46*** | (2020.01) |
| ***A24F 40/48*** | (2020.01) |
| ***H05B 3/16*** | (2006.01) |

(52) U.S. Cl.

CPC .............. *A24F 40/42* (2020.01); *A24F 40/10* (2020.01); *A24F 40/44* (2020.01); *A24F 40/46* (2020.01); *A24F 40/48* (2020.01); *H05B 3/16* (2013.01); *H05B 2203/021* (2013.01)

(58) Field of Classification Search

CPC ........... A24F 40/42; A24F 40/46; A24F 40/48

See application file for complete search history.

(56) References Cited

U.S. PATENT DOCUMENTS

2013/0180533 A1* 7/2013 Kim ........................ A24F 40/42 131/273

2016/0073692 A1* 3/2016 Alarcon .................. A24F 40/42 131/329

2016/0143358 A1* 5/2016 Zhu ......................... A24F 40/46 392/404

(Continued)

FOREIGN PATENT DOCUMENTS

EP 3 061 357 A1 8/2016

EP 3 871 529 A1 9/2021

(Continued)

OTHER PUBLICATIONS

"Apart", dictionary.com, accessed Feb. 14, 2025 (Year: 2025).*

Extended European Search Report dated Oct. 23, 2023 for Application No. 20920807.3.

*Primary Examiner* — Michael H. Wilson

*Assistant Examiner* — Stephanie Lynn Moore

(74) *Attorney, Agent, or Firm* — Birch, Stewart, Kolasch & Birch, LLP

(57) ABSTRACT

A cartridge used in a non-combustion type suction device having a suction port includes a tank having a liquid storage in which a liquid is storable; a heater to which the liquid in the liquid storage is supplied and configured to heat the liquid; and an atomizing container configured to support the heater, in which the atomizing container includes a liquid holder configured to hold the liquid and provided apart from the heater, and a liquid guide configured to recirculate the liquid held in the liquid holder to the heater.

20 Claims, 9 Drawing Sheets

(56) References Cited

U.S. PATENT DOCUMENTS

| | | | | |
|---|---|---|---|---|
| 2018/0168236 | A1* | 6/2018 | Qiu | A61M 15/002 |
| 2018/0289060 | A1* | 10/2018 | Chen | A24F 40/50 |

FOREIGN PATENT DOCUMENTS

| | | | |
|---|---|---|---|
| JP | 6525228 | B1 | 6/2019 |
| JP | 110813172 | A | 12/2019 |
| WO | WO 2018/158566 | A1 | 9/2018 |

* cited by examiner

CARTRIDGE AND NON-COMBUSTION TYPE SUCTION DEVICE

CROSS REFERENCE TO RELATED APPLICATIONS

This application is a continuation application based on a PCT Patent Application No. PCT/JP2020/008234, filed on Feb. 28, 2020, the content of which is incorporated herein by reference.

BACKGROUND

Technical Field

The present invention relates to a cartridge and a non-combustion type suction device including the cartridge.

Background Art

In the related art, a non-combustion type suction device (hereinafter, simply referred to as a suction device) that sucks vapor (for example, aerosol) atomized by heating has been known. This type of suction device includes, for example, a cartridge storing an atomizable liquid (for example, an aerosol source) and a main body unit.

As shown in PCT International Publication No. WO2018/158566, Japanese Patent No. 6525228, and European Patent Application, Publication No. 3061357, in the conventional suction device, the heater provided in the cartridge generates heat, and the liquid sucked up to the heater is heated and atomized. The user sucks the atomized vapor together with the air.

The above-mentioned suction device of the related art has a mechanism for preventing liquid leakage to the outside of the cartridge. However, when the shape design of the cartridge is restricted, a different liquid leakage prevention structure is required.

In view of the above circumstances, an object of the present disclosure is to provide a cartridge having a new mechanism for preventing liquid leakage to an outside of a cartridge and a non-combustion type suction device provided with the cartridge.

SUMMARY

According to a first aspect of the present disclosure, there is provided a cartridge which is used in a non-combustion type suction device having a suction port, the cartridge including: a tank having a liquid storage in which a liquid is storable; a heater to which the liquid in the liquid storage is supplied and configured to heat the liquid; and an atomizing container configured to support the heater, in which the atomizing container includes a liquid holder configured to hold the liquid and provided apart from the heater, and a liquid guide configured to recirculate the liquid held in the liquid holder to the heater. According to a second aspect of the present disclosure, there is provided a non-combustion type suction device including the cartridge.

DETAILED DESCRIPTION OF THE PREFERRED EMBODIMENT

First Embodiment

A first embodiment of the present disclosure will be described with reference to FIGS. 1 to 8.

Figure 1:
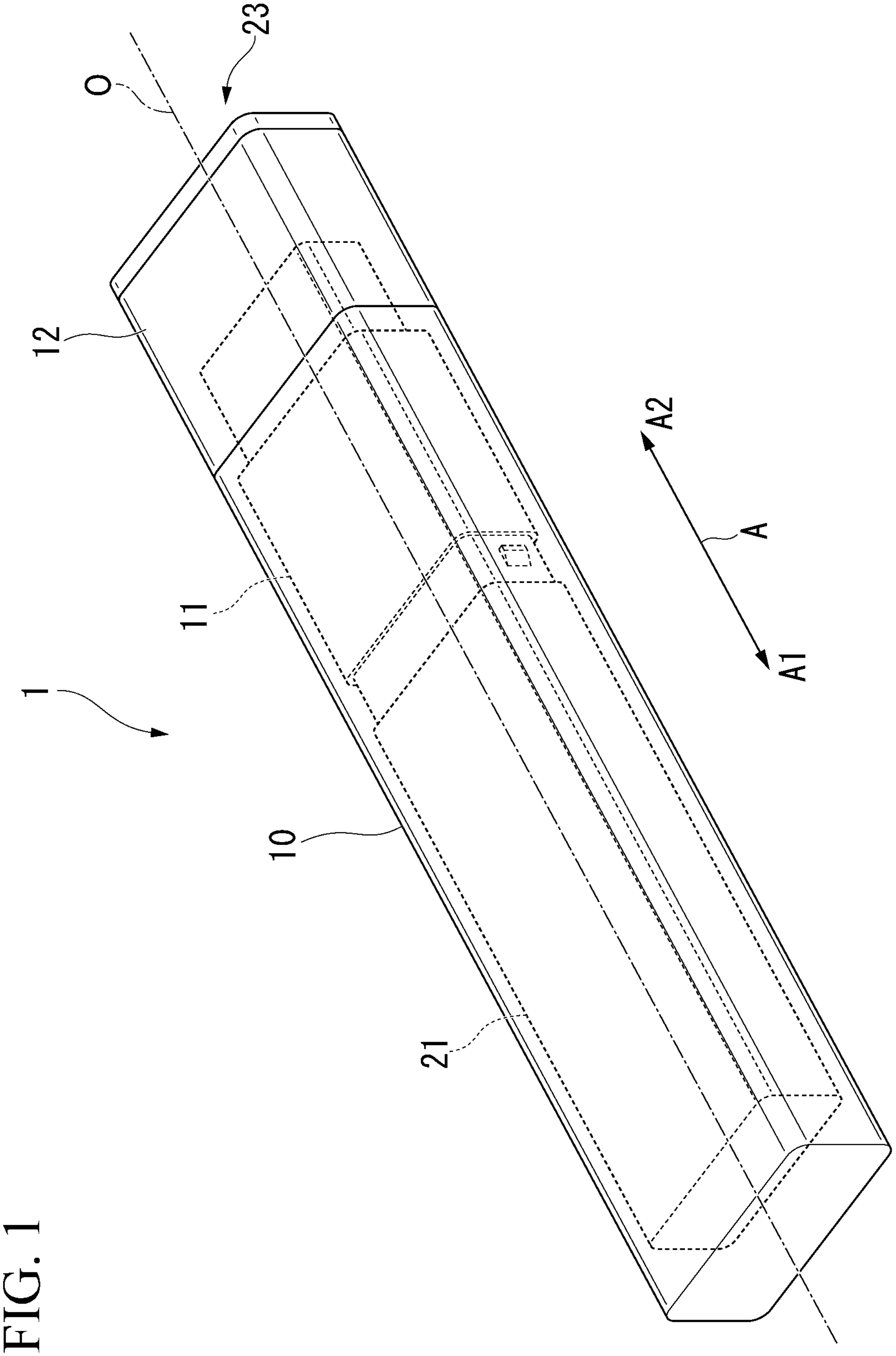
FIG. 1 is a view showing an overall configuration of a suction device including a cartridge according to a first embodiment of the present disclosure.
Figure 2:
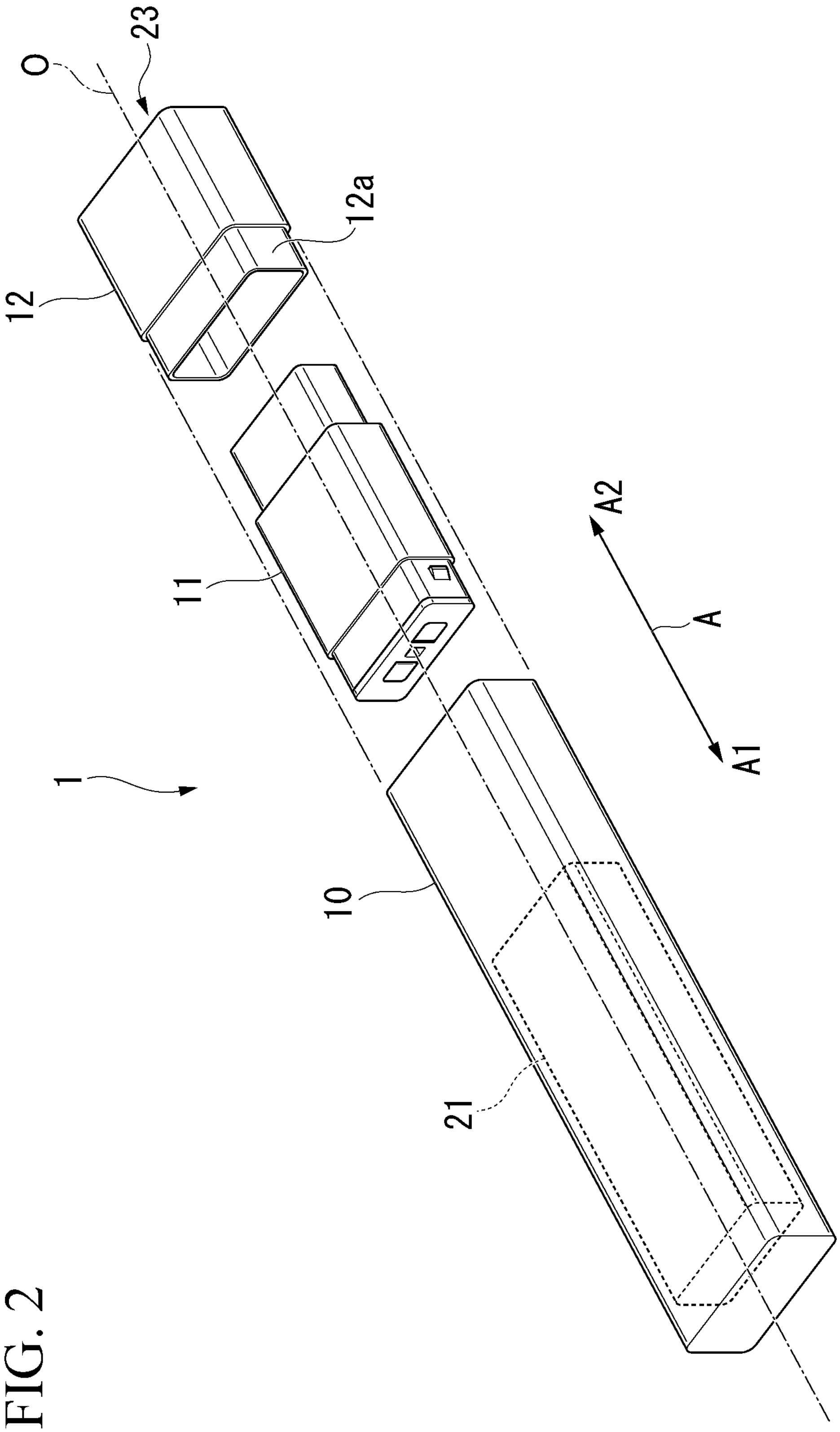
FIG. 2 is an exploded view of the suction device.

FIG. 1 is a view showing an overall configuration of a suction device 1 including a cartridge 11 according to the present embodiment. FIG. 2 is an exploded view of the suction device 1.

<Suction Device>

The suction device 1 is a so-called non-combustion type suction device. The suction device 1 is configured to apply components of a tobacco leaf to the aerosol by sucking aerosol atomized by heating through the tobacco leaf. The suction device 1 includes a main body unit 10, a cartridge (also referred to as an atomization unit) 11 detachably attached to the main body unit 10, and a tobacco capsule 12 having a mouthpiece (also referred to as a suction port) 23.

The main body unit 10, the cartridge 11, and the tobacco capsule 12 are each disposed side by side on an axis O. In the following description, a direction along the axis O is referred to as an axial direction A. In the present specification, the “direction A” means two directions, and in the axial direction A, one direction from the tobacco capsule 12 toward the main body unit 10 can be referred to as a “non-suction side direction A1” or a “first side”, and the other side from the main body unit 10 toward the tobacco capsule 12 can be referred to as a “suction side direction A2” or a “second side”. Further, a direction that intersects the axis O in a plan view from the axial direction A may be referred to as a radial direction R, and a direction that orbits around the axis O may be referred to as a circumferential direction C.

<Main Body Unit>

The main body unit 10 includes a power supplier 21. The power supplier 21 includes a battery such as a storage battery, and supplies electric power to the cartridge 11. The power supplier 21 is electrically connected to the cartridge 11 attached to the main body unit 10.

<Tobacco Capsule>

As shown in FIG. 1, the tobacco capsule 12 is detachably attached to the main body unit 10 to which the cartridge 11 is attached. The tobacco capsule 12 has the mouthpiece (also referred to as the suction port) 23. Tobacco leaves or the like are enclosed in the tobacco capsule 12. The tobacco capsule

12 has a connector 12*a* that is fitted and connected to the main body unit 10 on the non-suction side in the axial direction.

<Cartridge>

Figure 3:
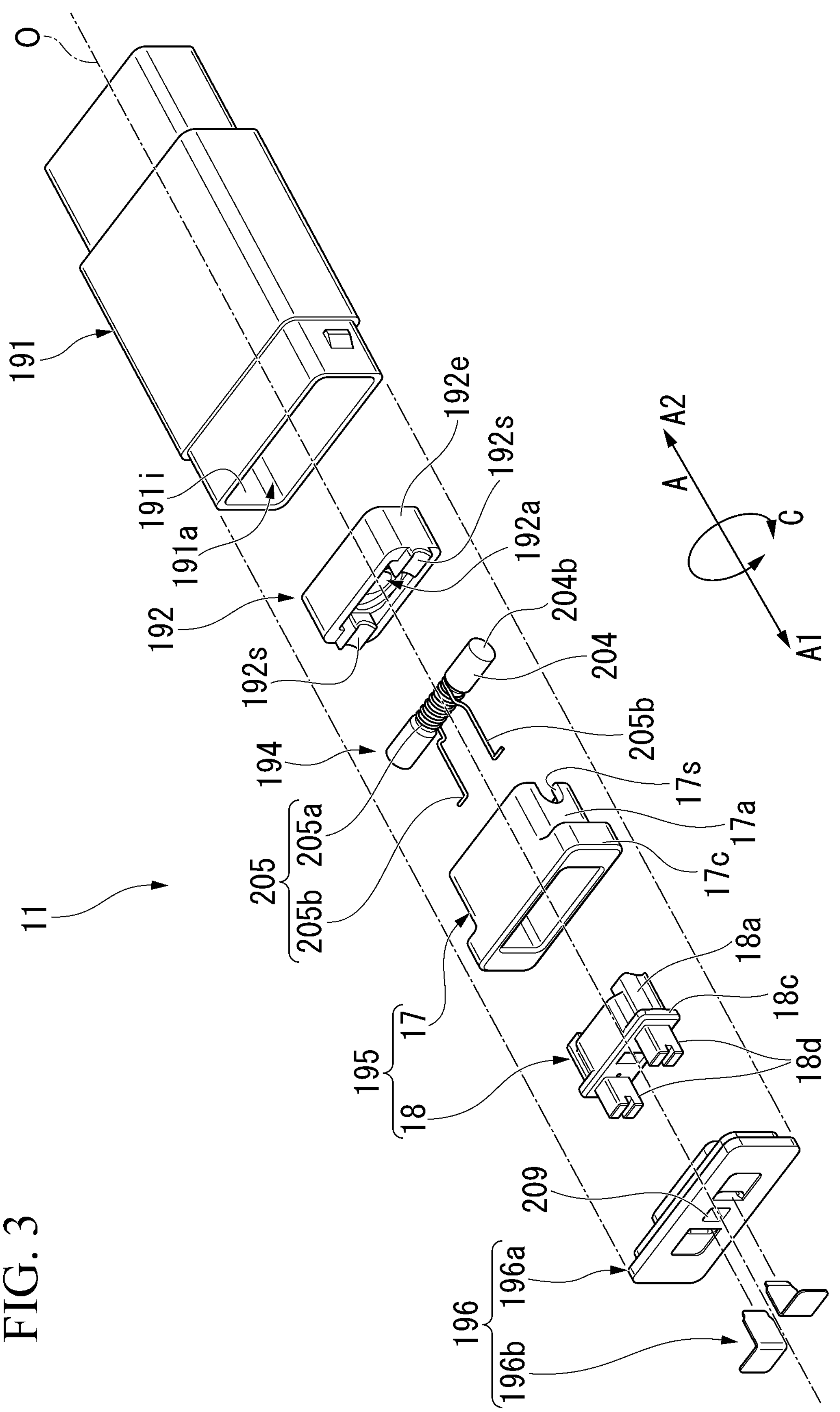
FIG. 3 is an exploded view of the cartridge.
Figure 4:
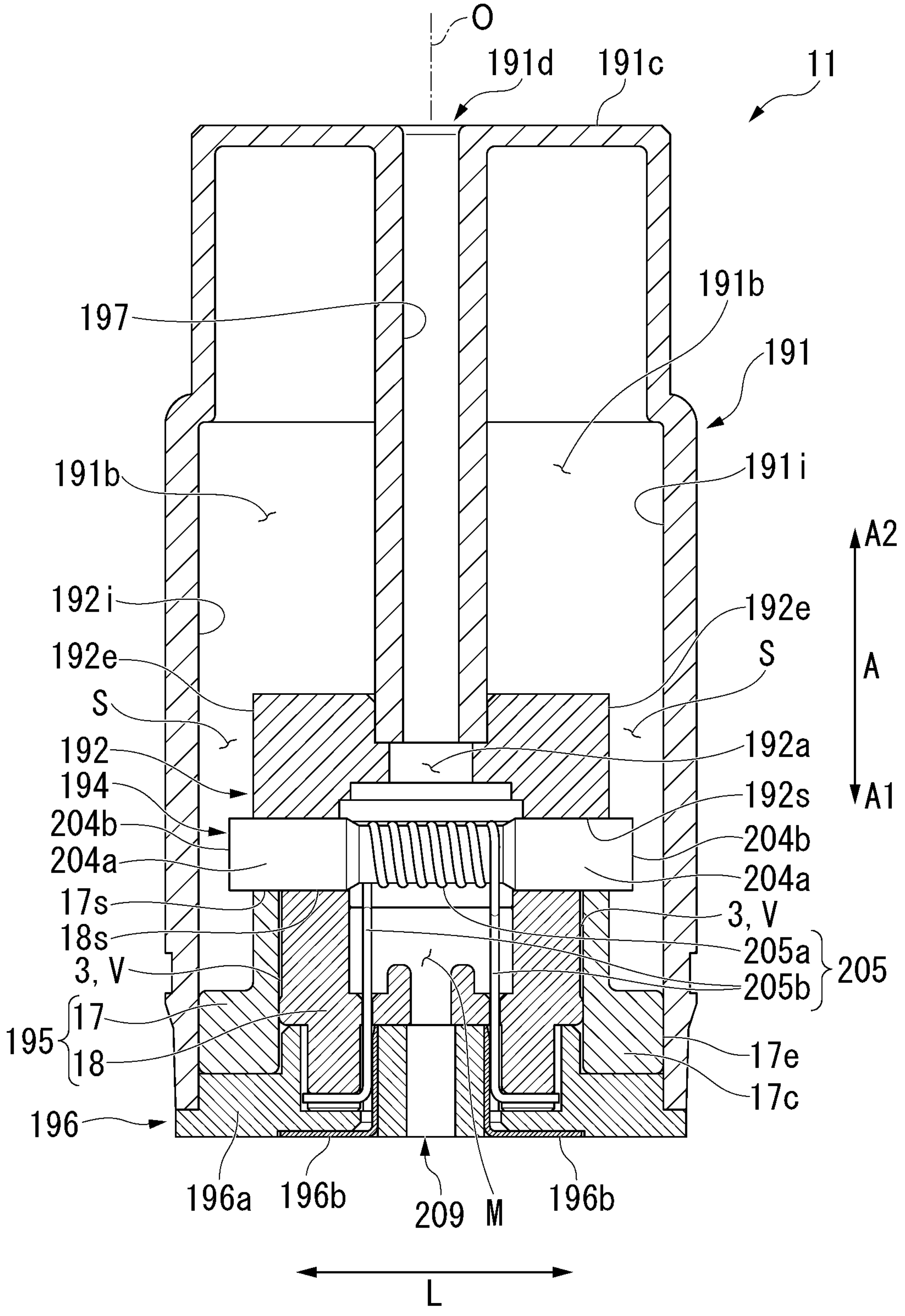
FIG. 4 is a cross-sectional view taken along an axial direction of the cartridge.

FIG. 3 is an exploded view of the cartridge 11. FIG. 4 is a cross-sectional view taken along the axial direction A of the cartridge 11. The cartridge 11 stores a liquid aerosol source and atomizes the liquid aerosol source. The cartridge 11 is detachably stored in the main body unit 10.

The cartridge 11 includes a tank 191, a gasket 192, a heater 194, an atomizing container 195, and a heater holder 196 that closes an opening portion 191*a* of the tank 191. The tank 191, the gasket 192, the heater 194, the atomizing container 195, and the heater holder 196 are arranged along the axial direction A of the cartridge 11. The axial direction A of the cartridge 11 coincides with the axial direction of the suction device 1. In addition, the phrase "arranging along the axial direction A" includes an aspect of arranging each parts in a partially or completely overlapping state in the axial direction A.

The tank 191 has a liquid storage 191*b* in which a liquid that can be in an atomization (for example, an aerosol source) is stored. The tank 191 is disposed on the suction side with respect to the heater 194 in the axial direction A. The opening portion 191*a* is opened on the heater 194 side of the thank 191 in the axial direction A. A through hole 191*d* passing through a bottom portion 191*c* is formed in a center of the bottom portion 191*c* of the tank 191 in the radial direction R. An annular channel tube (also referred to as a channel) 197 is integrally formed on a peripheral edge of the through hole 191*d* and protrudes into the tank 191 from an inner surface of the bottom portion 191*c*. The inside of the channel tube 197 and the through hole 191*d* communicate with each other. The channel tube 197 is a channel for the atomized aerosol. The channel tube 197 extends from the bottom portion 191*c* to a position closer to the opening portion 191*a* than substantially a middle of the tank 191 in the axial direction A.

The gasket 192 positions the heater 194 and supports the heater 194. An insertion hole 192*a* into which the channel tube 197 is configured to be inserted is formed at the center of the gasket 192 in the radial direction R. The gasket 192 is housed in the tank 191 so that a portion of the channel tube 197 is inserted into the insertion hole 192*a*. The insertion hole 192*a* of the gasket 192 is in contact with an outer peripheral surface of the channel tube 197.

The aerosol source in the liquid storage 191*b* of the tank 191 is supplied to the heater 194 via a space S between an outer peripheral surface 192*e* of the gasket 192 and an inner peripheral surface 191*i* of the tank 191.

The gasket 192 has support surfaces 192*s* on the heater 194 side in the axial direction A. The support surfaces 192*s* support both end portions of the heater 194. The support surface 192*s* is curved in accordance with the shape of each of both end portions of the heater 194 formed in a substantially columnar shape.

Figure 5:
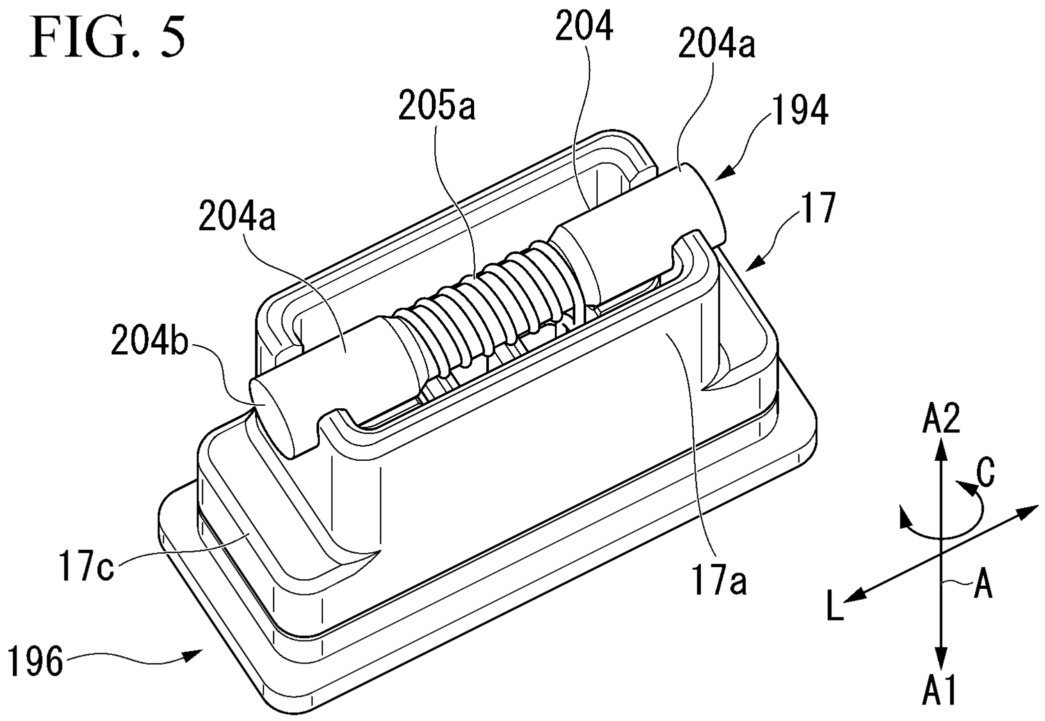
FIG. 5 is a perspective view of a heater, an atomizing container, and a heater holder of the cartridge.

FIG. 5 is a perspective view of the heater 194, the atomizing container 195, and the heater holder 196.

The heater 194 atomizes the liquid aerosol source. Both end portions of the heater 194 are supported by the gasket 192 and the atomizing container 195. The heater 194 includes a wick 204 formed in a straight line and a heating wire 205 for heating the wick 204.

The wick (columnar portion) 204 is porous and a substantially columnar member. The wick 204 has a liquid absorbing property. Both end portions 204*a* of the wick 204 are supported by the gasket 192 and the atomizing container 195 so that a longitudinal axis of the wick 204 is perpendicular to the axis O. As shown in FIG. 4, both end surfaces 204*b* of the wick 204 in the longitudinal axial direction L are located outside the gasket 192 and the atomizing container 195 in the longitudinal axial direction L. The aerosol source flowing from the space S between the outer peripheral surface 192*e* of the gasket 192 and the inner peripheral surface 191*i* of the tank 191 is sucked up by the wick 204.

The heating wire 205 includes a heating wire main body 205*a* spirally surrounding a periphery of a middle portion of the wick 204 in the longitudinal axial direction L and two terminal portions 205*b* which extend from both terminals of the heating wire main body 205*a* toward the heater holder 196 side along the axial direction A (the non-suction side direction A1). When the wick 204 is heated by the heating wire 205, the aerosol source absorbed by the wick 204 is atomized. The two terminal portions 205*b* are each folded back toward the outside in the radial direction R. The two terminal portions 205*b* are connected to the heater holder 196. Here, the heating wire main body 205*a* is made of a material having high electric resistance and easily generating heat when a current flows. Meanwhile, the terminal portion 205*b* is a general copper wire or the like, and is made of a material that is hard to generate heat when a current flows.

Figure 6:
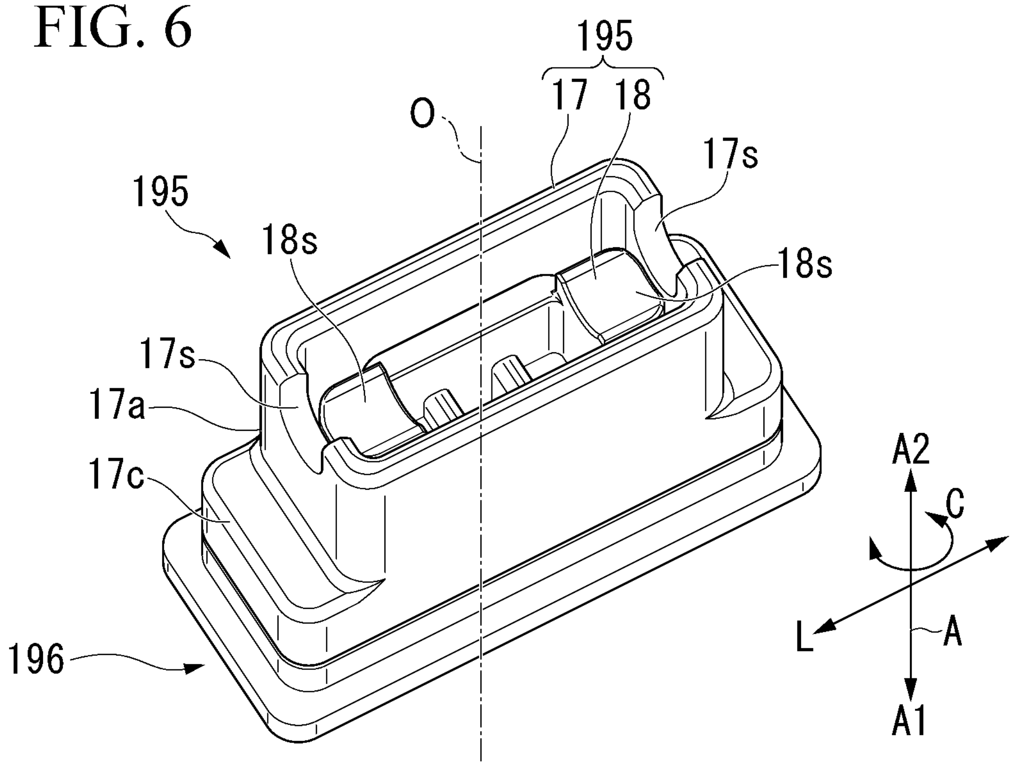
FIG. 6 is a perspective view of the atomizing container and the heater holder.
Figure 7:
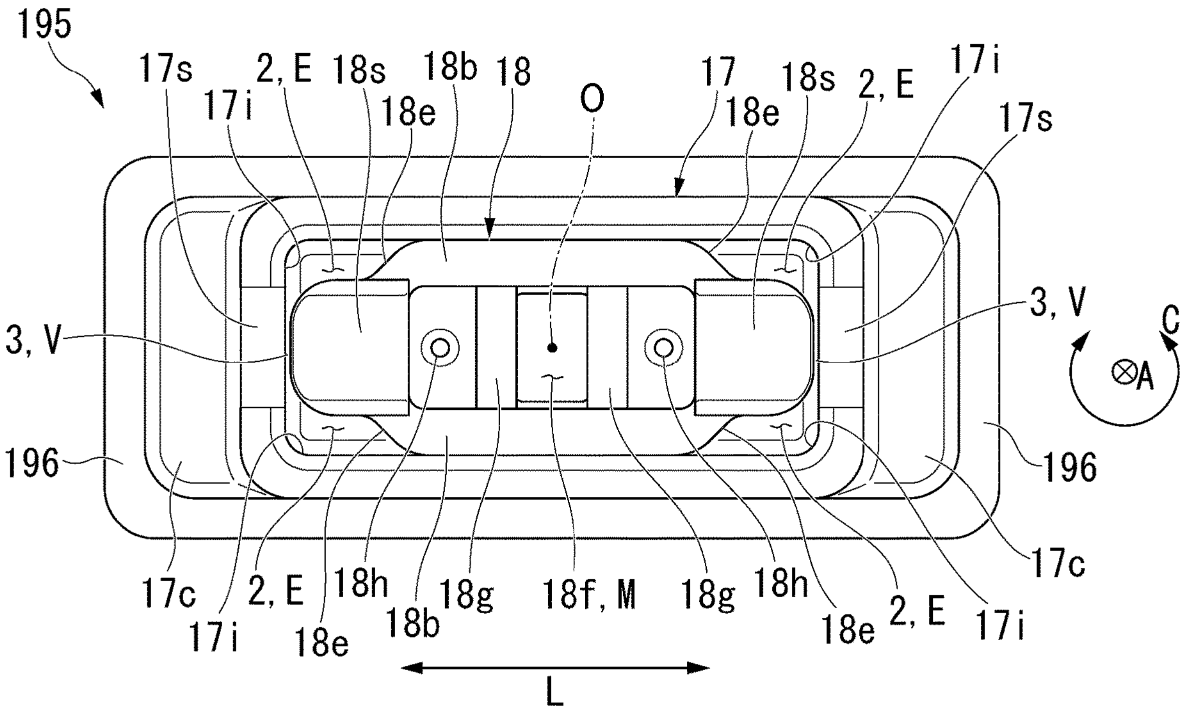
FIG. 7 is a plan view when the atomizing container and the heater holder are viewed from the axial direction.

FIG. 6 is a perspective view of the atomizing container 195 and the heater holder 196. FIG. 7 is a plan view when the atomizing container 195 and the heater holder 196 are viewed from the axial direction A.

The atomizing container 195 is made of an elastic member, for example, a resin material such as a silicone resin. The atomizing container 195 is disposed on the non-suction side than the heater 194 in the axial direction A. The atomizing container 195 and the gasket 192 support both end portions 204*a* of the wick 204. The atomizing container 195 is formed in a substantially square tubular shape. The atomizing container 195 has an atomization chamber M that penetrates in the axial direction A and communicates with the channel tube 197. In other words, the atomization chamber M is formed to penetrate the atomizing container 195 in the axial direction A and communicates with the channel tube 197. The aerosol source is atomized in the atomization chamber M.

The atomizing container 195 includes an outer tube 17 that supports both end portions 204*a* of the wick 204, and an inner tube 18 provided inside the outer tube 17. Here, the meaning of "the atomizing container 195 supports the wick 204" is not limited that only the atomizing container 195 supports the wick 204. As in this embodiment, the atomizing container 195 may support the wick 204 together with the gasket 192. Further, the meaning of "the atomizing container 195 supporting the wick 204" includes the atomizing container 195 being partially adjacent to or in contact with the wick 204.

The outer tube 17 is formed in a substantially square tubular shape. The outer tube 17 has an outer tube main body 17*a* and an outer tubular diameter expanding portion 17*c* provided on the non-suction side of the outer tube main body 17*a*. As shown in FIG. 4, an outer peripheral surface 17*e* of the outer tube 17 is in contact with the inner peripheral surface 191*i* of the tank 191.

The outer tube main body 17*a* has first support surfaces 17*s* on both sides interposing the axis O at the end portion on the suction side of the outer tube main body 17*a*. The first support surfaces 17*s* abut on and support both end portions 204*a* of the wick 204. The first support surface 17*s* has a substantially semicircular notch shape, and is curved in accordance with the shape of each of both end portions 204*a* of the wick 204 formed in a substantially columnar shape. As shown in FIGS. 5 and 6, the first support surface 17*s* extends from the lower side to a lateral side of the heater 194 along an outer peripheral surface of the heater 194 when viewed from the longitudinal axial direction L of the heater 194. Liquid leakage is suitably prevented by reducing a surface area of the wick 204 that does not face the first support surface 17*s* as much as possible.

In the wick 204 supported by the first support surface 17*s* of the outer tube main body 17*a*, both end surfaces 204*b* of the wick 204 are disposed outside the radial direction R of the outer tube 17 as shown in FIGS. 4 and 5. The aerosol source is sucked up by the wick 204 from the portion (including both end surfaces 204*b*) disposed on the outside of the outer tube 17.

The outer tubular diameter expanding portion 17*c* is expanded in the radial direction R as compared with the outer tube main body 17*a*, and is formed in a substantially rectangular shape in a plan view from the axial direction A. As shown in FIG. 4, the outer tubular diameter expanding portion 17*c* abuts on the heater holder 196 on the non-suction side direction A1 and abuts on the tank 191 on the suction side. Specifically, an outer peripheral surface of the outer tubular diameter expanding portion 17*c* abuts on the tank 191.

Figure 8:
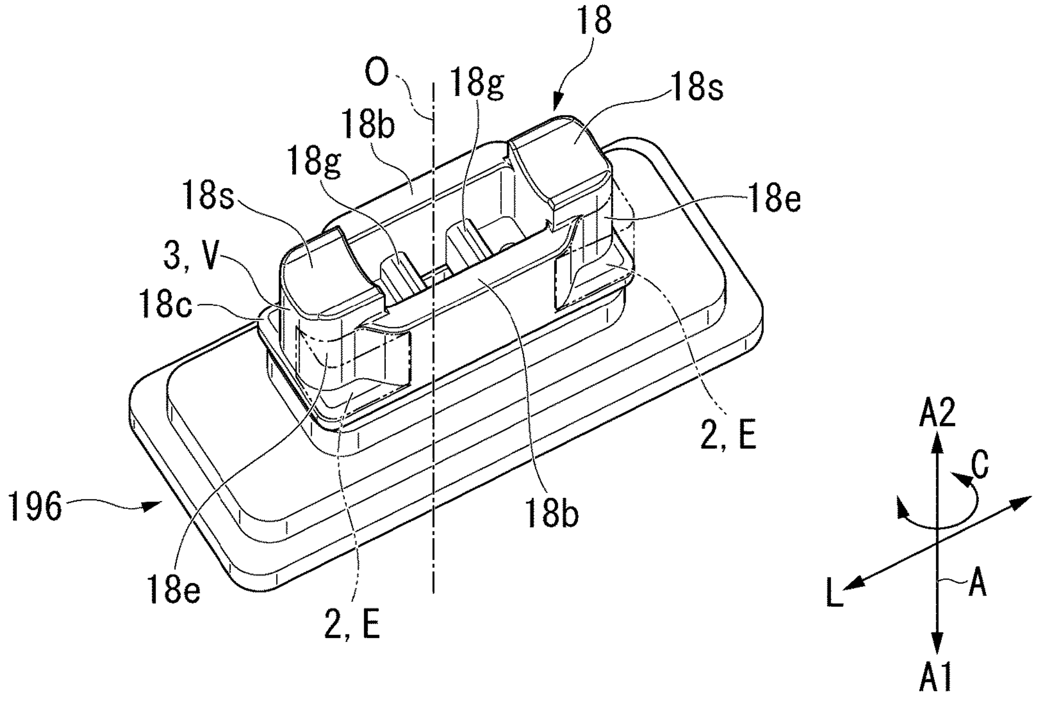
FIG. 8 is a perspective view of an inner tube of the atomizing container and the heater holder.

FIG. 8 is a perspective view of the inner tube 18 and the heater holder 196.

The inner tube 18 is formed in a substantially square tubular shape. The inner tube 18 includes an inner tube main body 18*a*, an inner tubular diameter expanding portion 18*c* provided on the non-suction side direction A1 of the inner tubular portion 18, and an inner tubular connecting protrusion portion 18*d* (refer to FIG. 3) provided on the non-suction side of the inner tubular diameter expanding portion 18*c*.

As shown in FIG. 8, the inner tube main body 18*a* has second support surfaces 18*s* on both sides of the longitudinal axial direction L interposing the axis O at the end portion on the suction side of the inner tube main body 18*a*. In other words, as shown in FIG. 8, the inner tube main body 18*a* has second support surfaces 18*s* on both sides interposing the axis O at the end portion on the suction side direction A2 of the inner tubular portion main body 18*a*. The second support surfaces 18*s* abut on and support both end portions 204*a* of the wick 204. The second support surface 18*s* is curved in accordance with the shape of each of both end portions 204*a* of the wick 204 formed in a substantially columnar shape. As shown in FIG. 6, at least a portion of the first support surface 17*s* and the second support surface 18*s* have the same level surfaces. The second support surface 18*s* extends from both end portions in the longitudinal axial direction L to the vicinity of the heating wire 205. Liquid leakage is suitably prevented by reducing a surface area of the wick 204 that does not face the second support surface 18*s* as much as possible. The second support surface 18*s* may extend to a lateral side of the heater 194 as in the case of the first support surface 17*s*.

As shown in FIG. 8, the inner tube main body 18*a* has inclined surfaces 18*b* on both sides in the axial direction A interposing the axis O at the end portion on the suction side direction A2. The inclined surface 18*b* is located on the non-suction side as compared with the second support surface 18*s*. The inclined surface 18*b* is inclined from the inside to the outside in the radial direction R toward the non-suction side direction A1. When the aerosol droplets dripping on the surface of the channel tube 197, the liquid tends to flow outward in the radial direction R along the inclined surface 18*b*. Therefore, the inclined surface 18*b* can positively guide, for example, the liquid dripping from the channel tube 197 to a liquid holder 2 described later.

As shown in FIGS. 7 and 8, a portion of the inner tubular diameter expanding portion 18*c* is expanded in the radial direction R as compared with the inner tube main body 18*a*. The inner tubular diameter expanding portion 18*c* is formed in a substantially rectangular shape in a plan view from the axial direction A. Specifically, the inner tubular diameter expanding portion 18*c* has four corners and both end portions of the longitudinal axial direction L that are expanded in the radial direction R when viewed from the longitudinal axial direction A, as compared with the inner tube main body 18*a*. The inner tubular diameter expanding portion 18*c* abuts on the heater holder 196 on the non-suction side.

The inner tubular diameter expanding portion 18*c* has an opening 18*f* passing through in the axial direction A. The inner tubular diameter expanding portion 18*c* has a pair of protrusion portions 18*g* protruding toward the suction side in the vicinity of the opening 18*f*. The pair of protrusion portions 18*g* is formed on both sides in the longitudinal axial direction L with the opening 18*f* interposed therebetween. It is possible to suitably suppress the liquid leaking from the wick 204 to the atomization chamber M from leaking to the outside of the atomization chamber M from the opening 18*f*.

The inner tubular diameter expanding portion 18*c* has two connection holes 18*h* through which the two terminal portions 205*b* are inserted. The two connection holes 18*h* are provided on both sides in the longitudinal axial direction L with the axis O interposed therebetween. As shown in FIG. 4, the two terminal portions 205*b* are connected to the electrode 196*b* of the heater holder 196, which will be described later, by inserting each of the connection holes 18*h*.

As shown in FIG. 3, the inner tubular connecting protrusion portion 18*d* is a protrusion portion for connecting to the heater holder 196. The inner tube 18 and the heater holder 196 are fixed to each other by fitting the inner tubular connecting protrusion portion 18*d* with the connection recessed portion (not shown) formed in the heater holder 196.

The heater holder 196 is formed in a substantially rectangular shape when viewed from the axial direction A, and closes the opening portion 191*a* of the tank 191. The heater holder 196 has a heater holder main body 196*a* and an electrode 196*b*. The heater holder main body 196*a* has a ventilation hole 209 for introducing air into the atomization chamber M. The electrode 196*b* is electrically connected to the power supplier 21 when the cartridge 11 is attached to the main body unit 10.

<Liquid Holder and Liquid Guide>

As shown in FIG. 7, the liquid holder 2 and a liquid guide 3 are formed between the inner peripheral surface 17*i* of the outer tube 17 and the outer peripheral surface 18*e* of the inner tube 18. The liquid holder 2 and the liquid guide 3 are provided apart from the liquid storage 191*b* of the tank 191 in which the liquid is stored.

The liquid holder 2 can hold the liquid (for example, an aerosol source) leaking from the wick 204, and is provided apart from the heater 194. The liquid leakage from the wick 204 can occur due to various reasons. For example, the liquid leakage occurs when the liquid is excessively supplied to the wick 204 due to the difference between the internal pressure and the external air pressure of the liquid storage 191*b*. As shown in FIG. 7, the liquid holder 2 is a space E formed between the inner peripheral surface 17*i* of the outer tube 17 and the outer peripheral surface 18e of the inner tube 18. The liquid holder 2 is formed at each of four inner corners of the atomizing container 195 when viewed from the axial direction A.

As shown in FIG. 8, more specifically, the liquid holder 2 is a space E defined by an upper surface of the inner tubular diameter expanding portion 18c on the suction side, a side surface which is not in contact with the inner peripheral surface 17i of the outer tube 17 on the outer peripheral surface 18e of the inner tube main body 18a, and the inner peripheral surface 17i of the outer tube 17. The liquid holder 2 can hold the liquid up to the same height position as the inclined surface 18b in the axial direction A. Since the inclined surface 18b is located on the non-suction side with respect to the second support surface 18s that supports the heater 194, the liquid holder 2 is separated from the heater 194.

The liquid guide 3 is a channel for recirculating the liquid held in the liquid holder 2 to the heater 194. As shown in FIG. 7, the liquid guide 3 is a gap V formed between the inner peripheral surface 17i of the outer tube 17 and the outer peripheral surface 18e of the inner tube 18. A width of the gap V can be appropriately set according to a magnitude of a capillary force that the liquid guide 3 sucks up the liquid, a distance from the liquid holder 2 to the heater 194, and the like, and for example, the width V is 0.05 mm or greater and 0.2 mm or less, and more preferably, 0.05 mm or greater and 0.15 mm or less. Here, the width of the gap V is a distance between the inner peripheral surface 17i of the outer tube 17 and the outer peripheral surface 18e of the inner tube 18. The liquid guides 3 are disposed at two locations facing each other in the radial direction R when viewed from the axial direction A. More specifically, the liquid guides 3 are disposed at two locations facing each other in the longitudinal axial direction L. The liquid guide 3, the first support surface 17s, and the second support surface 18s are arranged along the longitudinal axial direction L when viewed from the axial direction A.

As shown in FIG. 7, the liquid holder 2 and the liquid guide 3 are arranged in the circumferential direction C of the cartridge 11 when viewed from the axial direction A. The liquid holder 2 is disposed to abut on both sides of the liquid guide 3 when viewed from the axial direction A. The liquid held in the liquid holder 2 can flow into the liquid guide 3. The two liquid holders 2 disposed to abut on both sides of the liquid guide 3 are connected to each other via the liquid guide 3. In the two liquid holders 2, an amount of liquid to be held is not biased, and the amount of liquid to be held is averaged.

As shown in FIG. 8, more specifically, the liquid guide 3 is the gap V interposed between the upper surface of the inner tubular diameter expanding portion 18c on the suction side, the outer peripheral surface 18e of the inner tube main body 18a, and the inner peripheral surface 17i of the outer tube 17. The liquid guide 3 extends to the same height position as the first support surface 17s and the second support surface 18s in the axial direction A. The liquid guide 3 can suck up the liquid to the same height position as the first support surface 17s and the second support surface 18s by the capillary force, and recirculate the liquid through the gap V between the first support surface 17s and the second support surface 18s to the wick 204 supported by the first support surface 17s and the second support surface 18s.

A distance between the inner peripheral surface 17i of the outer tube 17 and the outer peripheral surface 18e of the inner tube 18 is larger in the liquid holder 2 than in the liquid guide 3. A volume at which the liquid holder 2 can hold the liquid is larger than a volume at which the liquid guide 3 can hold the liquid.

The outer peripheral surface 18e of the inner tube 18 is curved at a portion approaching the liquid guide 3 from the liquid holder 2. The distance between the inner peripheral surface 17i of the outer tube 17 and the outer peripheral surface 18e of the inner tube 18 becomes gradually smaller as it approaches the liquid guide 3 from the liquid holder 2 when viewed from the axial direction A. Therefore, the liquid holder 2 promotes the suction of the liquid by the capillary force of the liquid guide 3.

<Operation of Cartridge>

Next, an operation of the cartridge 11 will be described. The aerosol source in the tank 191 flows through the gap between the outer peripheral surface 192e of the gasket 192 and the inner peripheral surface 191i of the tank 191 toward the non-suction side direction A1, and is supplied to the wick 204. When the heater 194 is energized, the heating wire 205 generates heat. Then, the liquid aerosol source impregnated in the wick 204 is heated and atomized. The atomized aerosol fills the atomization chamber M.

When a liquid aerosol source exceeding a liquid holding capacity of the wick 204 is supplied, the liquid aerosol source leaks from the wick 204. Here, the first support surface 17s extends from the lower side of the heater 194 to the lateral side thereof along the outer peripheral surface of the heater 194 when viewed from the longitudinal axial direction L of the heater 194. Further, the second support surface 18s extends to the vicinity of the heating wire 205 in the longitudinal axial direction L. Therefore, on the lower side of the wick 204, the portion other than the liquid guide 3 is generally covered with the first support surface 17s and the second support surface 18s. Therefore, the liquid aerosol source leaking from the wick 204 is guided to the liquid guide 3 and the liquid holder 2 communicating with the liquid guide 3.

The liquid aerosol source leaked to the inclined surface 18b travels along the inner peripheral surface 17i of the outer tube 17 and is collected in the liquid holder 2.

The liquid aerosol source collected in the liquid holder 2 flows into the liquid guide 3. The liquid holder 2 is disposed to abut on both sides of the liquid guide 3 in the circumferential direction C when viewed from the axial direction A. Therefore, the liquid holder 2 allows the liquid aerosol source to flow smoothly into the liquid guide 3 as compared with a case where the liquid holder 2 and the liquid guide 3 are arranged along the axial direction A.

The liquid guide 3 can suck up the liquid aerosol source by the capillary force and recirculate the aerosol source to the wick 204 supported by the first support surface 17s and the second support surface 18s. Since at least a portion of the first support surface 17s and the second support surface 18s have the same level surfaces and abuts on each other, the liquid guide 3 and the wick 204 can be disposed so that the liquid aerosol source sucked up by the liquid guide 3 is efficiently recirculated to the wick 204 which is not saturated. The amount of liquid held by the wick 204 may decrease due to the difference between the liquid storage 191b and the external air pressure, the generation of aerosol, and the like. In such a state, the capillary force that holds the liquid in the wick 204 is generated, and the recirculation occurs from the liquid guide 3 to the wick 204 as described above.

The aerosol atomized in the atomization chamber M is sucked up to the mouthpiece (suction port) 23 side via the channel tube 197 together with the air introduced from the ventilation hole 209 of the heater holder 196. After this, a mixed gas of the atomized aerosol and air enters a user's mouth through the tobacco capsule 12. This allows the user to obtain the scent of tobacco.

According to the cartridge 11 of the present embodiment, the liquid aerosol source leaked from the wick 204 is guided to the liquid guide 3 and the liquid holder 2 communicating with the liquid guide 3, and the liquid is suitably recirculated to the heater 194. As a result, the cartridge 11 suitably prevents the liquid from leaking to the outside of the cartridge 11.

As described above, the first embodiment of the present disclosure is described in detail with reference to the drawings. However, specific configurations are not limited to this embodiment, and include a design modification or the like within a scope which does not depart from the gist of the present disclosure. In addition, components shown in the above-described embodiment and modification examples shown below can be appropriately combined and configured.

Second Embodiment

A second embodiment of the present disclosure will be described with reference to FIGS. 9 to 11. In the following description, the same components as those already described are denoted by the same reference numerals, and repeated descriptions will be omitted. A cartridge 11B according to the second embodiment has a different configuration of the atomizing container as compared with the cartridge 11 according to the first embodiment.

Figure 9:
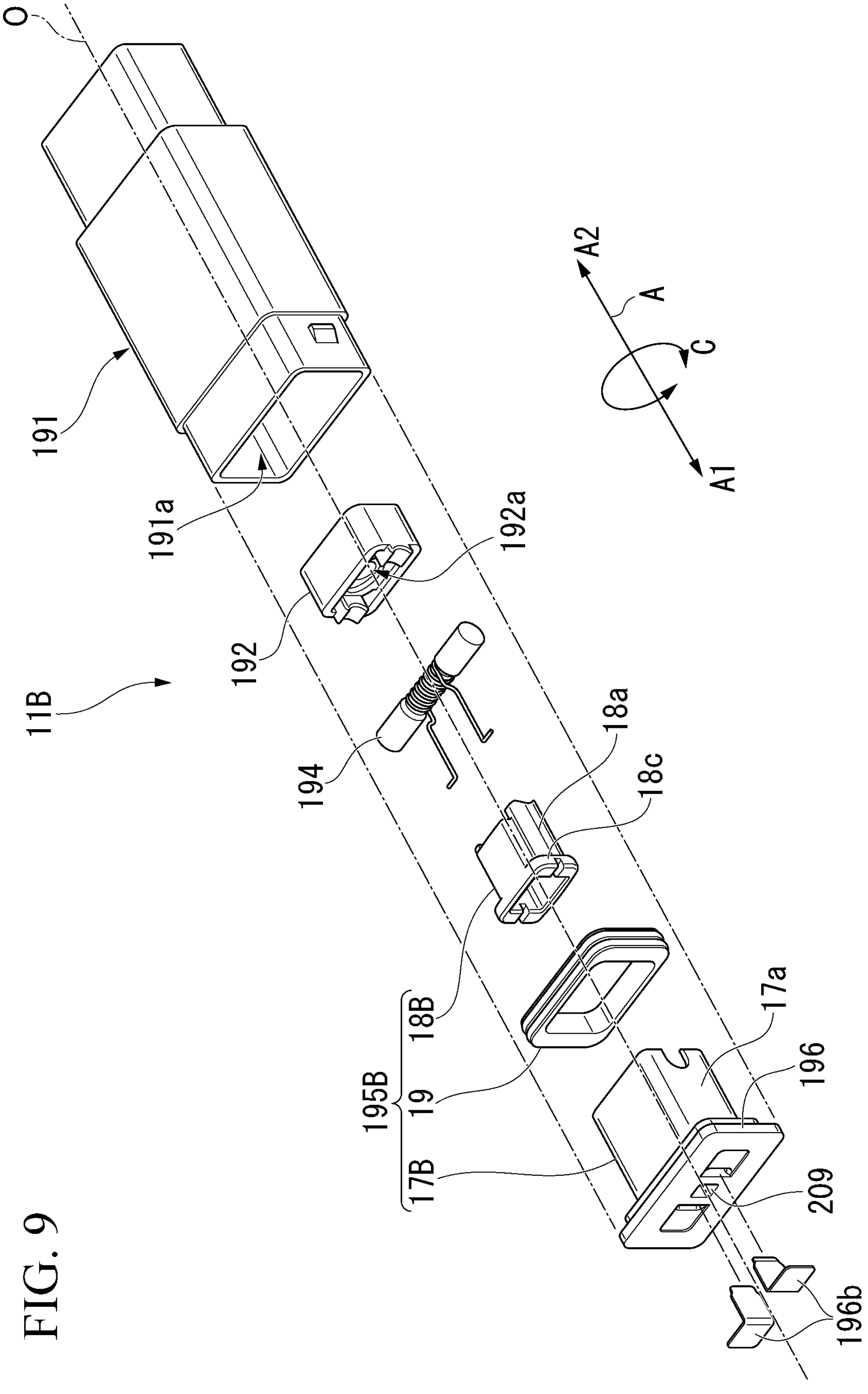
FIG. 9 is an exploded view of a cartridge according to a second embodiment of the present disclosure.
Figure 10:
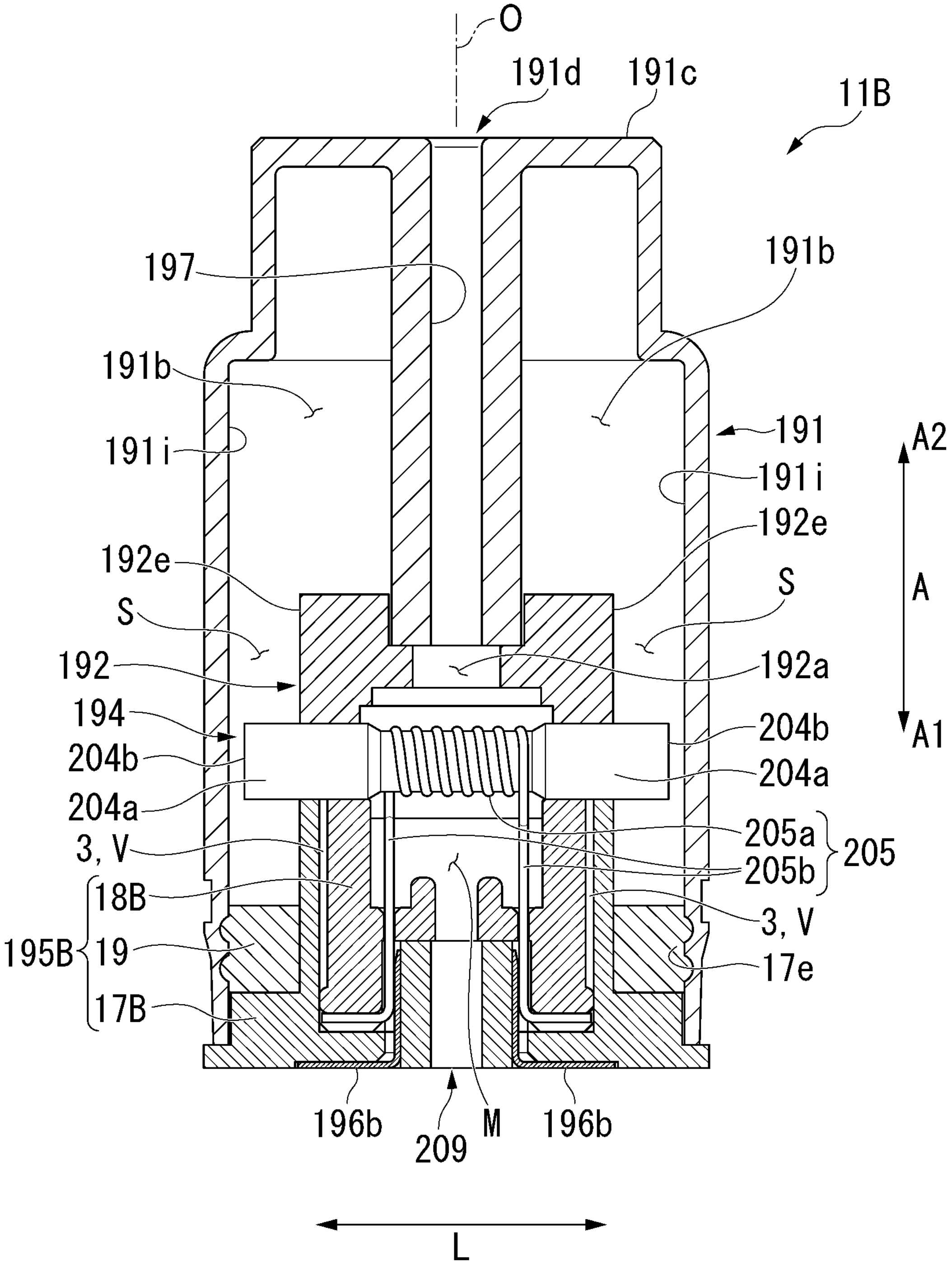
FIG. 10 is a cross-sectional view taken along the axial direction of the cartridge.

FIG. 9 is an exploded view of the cartridge 11B. FIG. 10 is a cross-sectional view taken along an axial direction A of the cartridge 11B. The cartridge 11B stores a liquid aerosol source and atomizes the liquid aerosol source. The cartridge 11B is housed in a main body unit 10.

The cartridge 11B includes a tank 191, a gasket 192, a heater 194, and an atomizing container 195B. The tank 191, the gasket 192, the heater 194, and the atomizing container 195B are arranged along the axial direction A of the cartridge 11B.

The atomizing container 195B has an outer tube 17B that supports both end portions 204*a* of a wick 204, an inner tube 18B provided inside the outer tube 17B, and a connector 19.

The outer tube 17B is formed in a substantially square tubular shape by a resin material. The outer tube 17B has an outer tube main body 17*a* and a heater holder 196 provided on the non-suction side of the outer tube main body 17*a*. The outer tube main body 17*a* and the heater holder 196 are integrally formed. As shown in FIG. 10, an outer peripheral surface 17*e* of the outer tube 17B is in contact with an inner peripheral surface 191*i* of the tank 191.

The inner tube 18B is formed in a substantially square tubular shape. The inner tube 18B is formed of an elastic member, for example, a resin material such as a silicone resin. The inner tube 18B has an inner tube main body 18*a* and an inner tubular diameter expanding portion 18*c* provided on the non-suction side of the outer tube main body 17*a*.

The connector 19 is a square annular member and is fitted to the outside of the outer tube main body 17*a*. As shown in FIG. 10, the connector 19 has an engaging protrusion portion 19*a* on the outer peripheral portion. The engaging protrusion portion 19*a* engages with an inner peripheral surface 191*i* of the tank 191.

Figure 11:
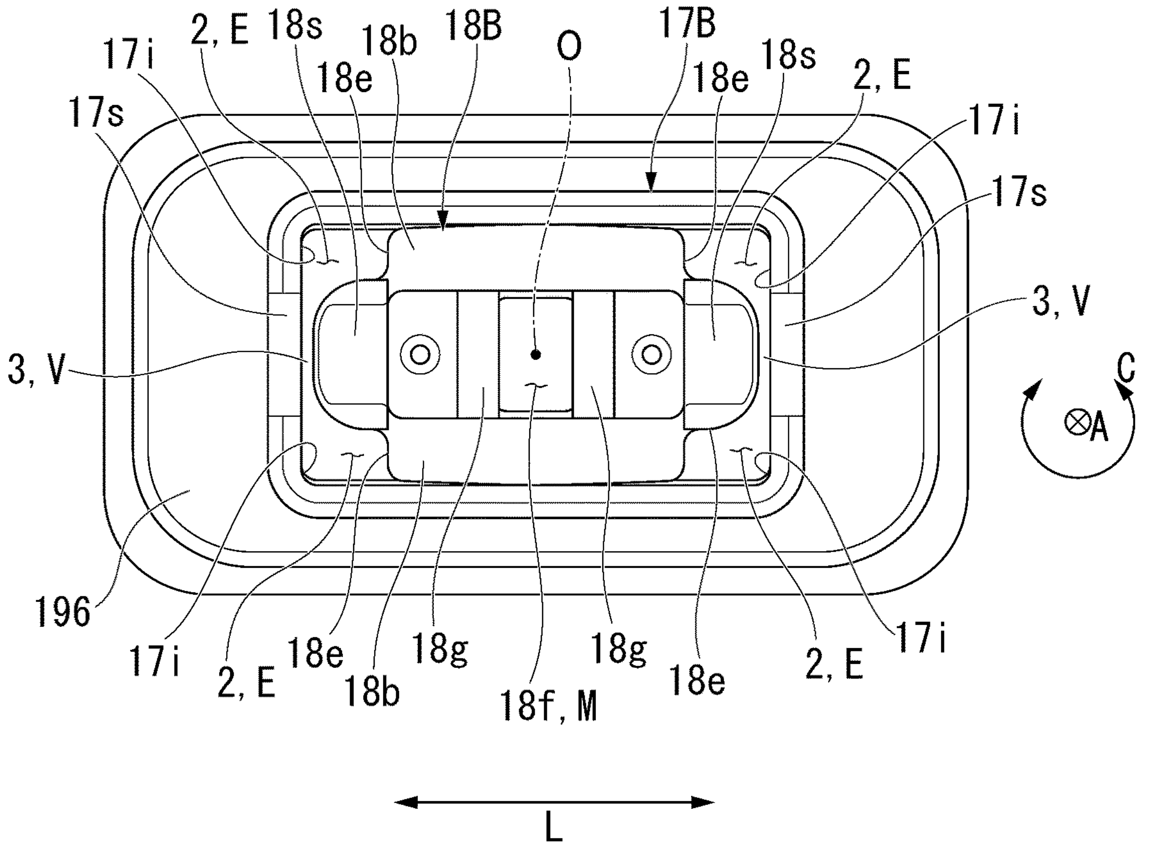
FIG. 11 is a plan view when an atomizing container and a heater holder are viewed from the axial direction.

FIG. 11 is a plan view when the atomizing container 195B is viewed from the axial direction A.

As shown in FIG. 11, a liquid holder 2 and a liquid guide 3 are formed between the inner peripheral surface 17*i* of the outer tube 17B and the outer peripheral surface 18*e* of the inner tube 18B, as in the first embodiment. The liquid guide 3 can suck up the liquid held in the liquid holder 2 by a capillary force and recirculate the liquid to the wick 204 supported by a first support surface 17*s* and a second support surface 18*s*.

According to the cartridge 11B of the present embodiment, the liquid aerosol source leaked from the wick 204 is guided to the liquid guide 3 and the liquid holder 2 communicating with the liquid guide 3, and the liquid can be suitably recirculated to the heater 194. As a result, the cartridge 11B suitably prevents the liquid from leaking to the outside of the cartridge 11B.

As described above, the second embodiment of the present disclosure is described in detail with reference to the drawings. However, specific configurations are not limited to the embodiment, and include a design modification or the like within a scope which does not depart from the gist of the present disclosure. In addition, components shown in the above-described embodiment and modification examples shown below can be appropriately combined and configured.

Modification Example 1

For example, in the above embodiment, the liquid holder 2 is formed at the four inner corners of the atomizing container 195 when viewed from the axial direction A, but the shape of the liquid holder is not limited to this. The liquid holders 2 may be provided only at two locations facing each other in the radial direction R when viewed from the axial direction A.

Modification Example 2

For example, the four liquid holders 2 may be connected by using a connecting path. The amount of liquid held by the four liquid holders 2 can be averaged by eliminating the bias in the amount of liquid held by the four liquid holders 2.

Modification Example 3

Figure 12:
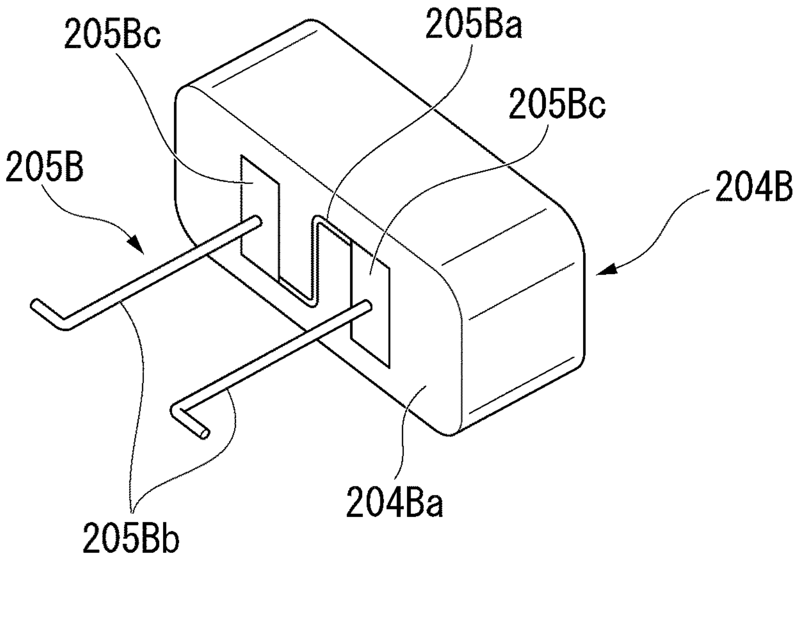
FIG. 12 is a perspective view of a modification example of a wick.

FIG. 12 is a perspective view of a wick 204B, which is a modification example of the wick 204.

The wick 204B is a substantially rectangular parallelepiped member made of ceramic. The non-suction side of the wick 204B is formed on a flat surface 204Ba. A heating wire 205B for heating the wick 204B is attached to the flat surface 204Ba. The wick 204B may be a member having a shape other than a substantially rectangular parallelepiped shape as long as the wick 204B has the flat surface 204Ba on the non-suction side.

The flat surface 204Ba abuts on the first support surface 17*s* and the second support surface 18*s*. Similar to the above embodiment, the liquid sucked up by the liquid guide 3 is recirculated to the wick 204B supported by the first support surface 17*s* and the second support surface 18*s*.

It is desirable that at least the portion of the first support surface 17*s* and the second support surface 18*s* that abuts on the flat surface 204Ba is formed in the same plane. Since the same plane formed by the first support surface 17*s* and the second support surface 18*s* abuts on the flat surface 204Ba, the liquid aerosol source sucked up by the liquid guide 3 is efficiently recirculated to the wick 204 which is not saturated.

The heating wire 205B has a heating wire main body 205Ba meandering to the flat surface 204Ba of the wick 204B, a connecting plate 205Bc formed at both ends of the heating wire main body 205Ba, and two terminal portions 205Bb which extend from the connecting plate 205Bc to the heater holder 196 side along the axial direction A.

The liquid supplied to the wick 204B is atomized when the heating wire main body 205Ba of the heating wire 205B generates heat.

What is claimed is:

1. A cartridge which is used in a non-combustion type suction device having a suction port, the cartridge comprising:

a tank having a liquid storage in which a liquid is storable;

a heater to which the liquid in the liquid storage is supplied and configured to heat the liquid; and an atomizing container configured to support the heater, the atomizing container including a liquid holder and at least one liquid guide extending from the liquid holder to the heater, the liquid holder being configured to hold the liquid, the liquid holder being provided apart from the heater, and the at least one liquid guide configured to recirculate the liquid held in the liquid holder to the heater, wherein the liquid holder is not in contact with the heater.

2. The cartridge according to claim 1, wherein the liquid storage is provided apart from the liquid holder and the at least one liquid guide.

3. The cartridge according to claim 1, wherein the liquid holder and the at least one liquid guide are arranged in a circumferential direction of the cartridge when viewed from an axial direction of the cartridge, wherein the tank is disposed on a side of the suction port with respect to the heater in the axial direction, and wherein the atomizing container is disposed on a side opposite to the suction port with respect to the heater in the axial direction.

4. The cartridge according to claim 3, wherein the at least one liquid guide is two liquid guides, and wherein the two liquid guides are disposed at two locations facing each other in a radial direction of the cartridge when viewed from the axial direction.

5. The cartridge according to claim 4, wherein the liquid holder is disposed to abut on both sides of the at least one liquid guide when viewed from the axial direction.

6. The cartridge according to claim 3, wherein the liquid holder is disposed to abut on both sides of the at least one liquid guide when viewed from the axial direction.

7. The cartridge according to claim 3, wherein the atomizing container includes:

an outer tube configured to support both end portions of the heater, and an inner tube provided inside the outer tube, wherein the at least one liquid guide is a gap formed between an inner peripheral surface of the outer tube and an outer peripheral surface of the inner tube.

8. The cartridge according to claim 7, wherein the liquid holder is a space formed between the inner peripheral surface of the outer tube and the outer peripheral surface of the inner tube, and wherein a distance between the inner peripheral surface of the outer tube and the outer peripheral surface of the inner tube is larger in the liquid holder than in the at least one liquid guide.

9. The cartridge according to claim 8, wherein when viewed from the axial direction, the distance becomes smaller as the space of the liquid holder approaches the at least one liquid guide.

10. The cartridge according to claim 7, wherein the outer tube has a first support surface configured to support the heater, wherein the inner tube has a second support surface configured to support the heater, and wherein at least a portion of the first support surface and the second support surface have same level surfaces.

11. The cartridge according to claim 10, wherein the heater has a columnar shape, and wherein the first support surface and the second support surface abut on an outer peripheral surface of the heater.

12. The cartridge according to claim 11, wherein the first support surface extends to a side of the heater.

13. The cartridge according to claim 10, wherein the at least one liquid guide recirculates the liquid to the heater through the gap between the first support surface and the second support surface.

14. The cartridge according to claim 10, wherein the heater includes:

a columnar portion having a liquid absorbing property, and a heating wire configured to surround a middle portion of the columnar portion, wherein the second support surface extends to a vicinity of the heating wire.

15. The cartridge according to claim 10, wherein the heater has a flat surface, and wherein the first support surface and the second support surface abut on the flat surface.

16. The cartridge according to claim 15, wherein the heater has a heating wire on the flat surface.

17. A non-combustion type suction device comprising the cartridge according to claim 1.

18. The cartridge according to claim 1, wherein the heater includes:

a liquid absorbing portion having a liquid absorbing property; and a heating wire configured to heat the liquid absorbing portion, wherein the liquid absorbing portion is in contact with the at least one liquid guide.

19. A non-combustion type suction device comprising the cartridge according to claim 18.

20. The cartridge according to claim 1, wherein the heater comprises a wick and a heating coil surrounding the wick.

* * * * *